(No Model.)

L. D. JUNKINS.
WHEEL RIM.

No. 602,020. Patented Apr. 5, 1898.

Witnesses:
Jas. F. Maloney.
H. J. Livermore

Inventor,
Leander D. Junkins.
by Jno. P. Livermore Atty.

UNITED STATES PATENT OFFICE.

LEANDER D. JUNKINS, OF BOSTON, MASSACHUSETTS, ASSIGNOR OF ONE-HALF TO ALEXANDER F. MUNRO, OF SAME PLACE.

WHEEL-RIM.

SPECIFICATION forming part of Letters Patent No. 602,020, dated April 5, 1898.

Application filed October 21, 1897. Serial No. 655,909. (No model.)

*To all whom it may concern:*

Be it known that I, LEANDER D. JUNKINS, of Boston, county of Suffolk, and State of Massachusetts, have invented an Improvement in Wheel-Rims, of which the following description, in connection with the accompanying drawings, is a specification, like letters on the drawings representing like parts.

The present invention relates to a wheel rim and tire, including the means for securing the tire to the rim, the object being to afford a strong and easily-manipulated fastening device for heavy pneumatic tires to be used with large and heavy vehicles, such as motor-carriages.

In accordance with the invention the fastening devices for the tire when in position also partially constitute the support for the tire, the said devices extending laterally from the rim proper, which receives the spokes, and being shaped to conform to and support that part of the tire which projects beyond the sides of the rim and is not directly supported by said rim, the said tire, however, extending substantially completely across the face of the rim, so that the tire is adequately supported and the air-tube unbroken and complete.

In carrying out the invention the rim proper is preferably made of wood and the fastening devices of metal, the said fastening devices having lateral extensions to fit the curve of the tire and being adapted to be clamped to the sides of the rim proper, as by bolts extending through the said fastening devices and the rim proper and secured by nuts. It is obvious, however, that the rim proper may be also made of metal, it not being essential to the invention that the said parts should be of any particular materials.

Figure 1:
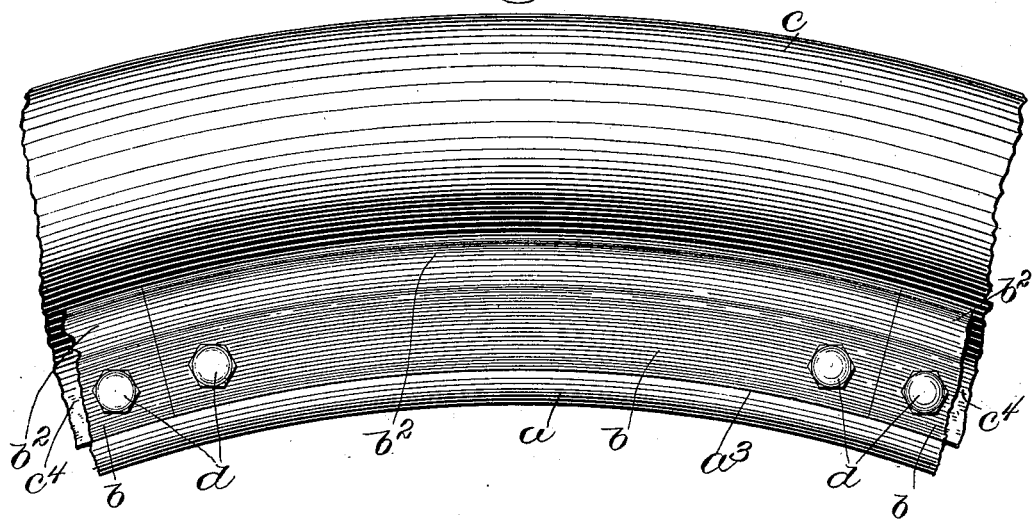
Figure 2:
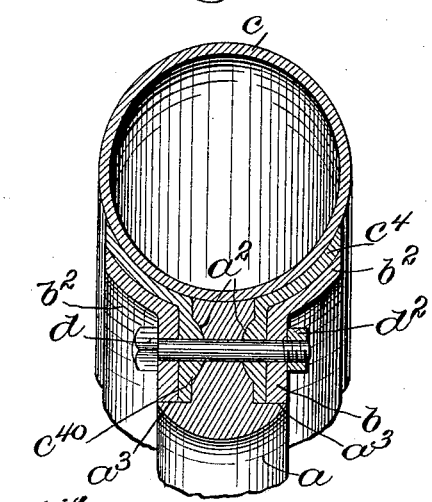

Figure 1 is a side elevation of a portion of the wheel-rim having a tire attached thereto in accordance with the invention; Fig. 2, a transverse section of the same; and Fig. 3, a modification showing the tire permanently secured to the fastening devices instead of clamped between the same and the rim, an inner tube being shown in this instance and the outer tube having its edges brought together to support the same.

The rim as a whole may be described as consisting of the rim proper, $a$, which is adapted to receive the spokes of the wheel, (not herein shown,) and the fastening devices $b$, which serve to secure the tire $c$ to the rim, the said fastening devices when in position having laterally-curved extensions $b^2$ to form, in conjunction with the rim proper, $a$, a channel to conform to and support the rounded or cylindrical surface of the tire.

Figure 3:
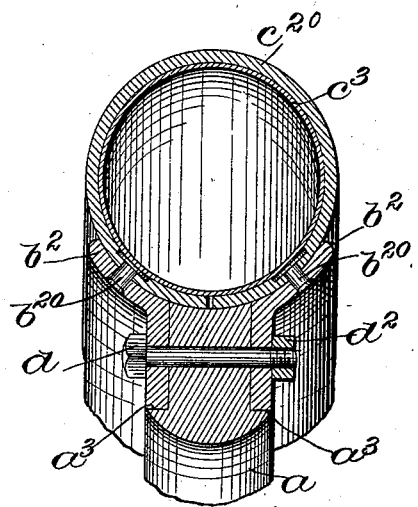

The fastening devices $b$ may be annular and continuous, if desired, but are herein shown as made in sections, each section being secured to the rim proper, $a$, by means of the transverse bolts $d$, which extend through the main portions of said fastening devices and through suitable openings in the rim, as best shown in Figs. 2 and 3, and secured in position by means of nuts $d^2$.

As shown in Fig. 2, the tire $c$ is of the single-tube type and is shown as having extensions or flaps $c^4$ projecting from its outer surface and adapted to lie along the sides of the wheel-rim $a$, while the tire itself extends across and is supported on the face of the rim $a$. The main portions of the fastening devices $b$ are then drawn into contact with the outside of the said extensions $c^4$, so that the said extensions are clamped between the sides of the rim and the said fastening devices, as shown. With this construction it is desirable to provide the rim $a$ with a channel $a^2$ at each side thereof to receive the ribs or projections $c^{40}$, formed along the inner surface of the projections $c^4$, so that when the tire is clamped in position it cannot be pulled out of the channel formed by the rim and the fastening devices.

To make the rim uniform in shape after the tire is fastened thereto and also to provide a proper support for the ends of the tire-flaps $c^4$ and for the fastening devices $b$, the said rim is shown as provided with shoulders $a^3$, on which the fastening devices $b$ rest, the channels $a^2$ being formed in the sides of that portion of the rim which projects above the said shoulders, which forms, so to speak, a "supporting-tongue" for the body of the tire, the said tongue being strengthened by the fastening devices which are clamped thereto, while the body of the rim below the said fastening devices has sufficient sectional area to afford the necessary strength where the spokes are fastened, the said body being preferably curved, as shown, along its under or inner surface.

When a tire of the inner-tube type is to be used, as shown in Fig. 3, the outer protecting-tube $c^{20}$ may be permanently secured to the fastening devices instead of clamped thereto, the said outer tube $c^{20}$ in this instance being open along its under side and riveted or otherwise fastened along the edges of said opening to the fastening devices $b$, the rivets $b^{20}$ being herein shown as extending through the said edges of the tire and the wings or extensions $b^2$ of the fastening devices, so that they are permanently secured thereto and held in position when the fastening devices are secured to the rim $a$. The edges of the outer tube, as shown, extend across the rim and meet, so that they afford a proper support for the inner tube, the whole tire being substantially continuous and extending completely across the rim. In this instance the tongue of the rim, which projects beyond the shoulders $a^3$, need not be provided with the channels $a^2$.

It will be seen from the foregoing description that the wheel-rim and fastening devices constructed in accordance with the invention afford a very efficient support and connection for the tire, as well as one which is readily applied and easily removed, if repairs are needed. Further than this, the rim proper and fastening devices together constitute a very strong wheel construction and when wood is used for the rim proper a construction which is as light as is practicable for heavy vehicles, for which the invention is especially adapted.

It is not intended to limit the invention to the specific construction herein shown and described, since modifications may obviously be made without departing from the invention.

I claim—

1. The combination with a wheel-rim, of a tire extending around the outer face thereof, the surface of said tire lying in contact with the said face and extending across the same, and fastening devices comprising plates or strips of suitable material provided with lateral extensions curved to conform to and support the surface of the tire where it projects beyond the sides of the rim so as to afford in conjunction with the said rim a channel to laterally support the tire, and means for securing said fastening devices to the opposite sides of the rim, substantially as and for the purpose described.

2. The combination with a wheel-rim, of a pneumatic tire comprising a continuous tube extending around and supported upon the outer face of said rim, flaps or extensions from the outer surface of the said tire separated from each other by a space substantially equal to the width of the said face across which the said tire extends between said flaps, fastening devices comprising plates or strips of suitable material adapted to engage the outer surfaces of the tire-flaps and to be secured to the wheel-rim at opposite sides thereof, and lateral extensions from said fastening devices curved to conform to and support the tire where it projects laterally beyond the said wheel-rim, substantially as described.

In testimony whereof I have signed my name to this specification in the presence of two subscribing witnesses.

LEANDER D. JUNKINS.

Witnesses:
 H. J. LIVERMORE,
 NANCY P. FORD.